United States Patent [19]
Stafford et al.

[11] Patent Number: 5,243,659
[45] Date of Patent: Sep. 7, 1993

[54] MOTORCYCLE STEREO AUDIO SYSTEM WITH VOX INTERCOM

[75] Inventors: Larry E. Stafford, Chandler, Ariz.;
John J. Lazzeroni, 7322 E. Stella Rd., Tucson, Ariz. 85730

[73] Assignees: John J. Lazzeroni; Melinda K. Carevich, both of Tucson, Ariz.

[21] Appl. No.: 837,140

[22] Filed: Feb. 19, 1992

[51] Int. Cl.$^5$ ............................................. H04B 1/00
[52] U.S. Cl. ...................................... 381/86; 381/94; 381/110
[58] Field of Search ...................... 381/86, 28, 110, 94, 381/1

[56] References Cited

U.S. PATENT DOCUMENTS

| | | |
|---|---|---|
| 3,623,064 | 11/1971 | Kagan . |
| 3,811,012 | 5/1974 | Barber . |
| 4,297,677 | 10/1981 | Lewis . |
| 4,380,824 | 4/1983 | Inoue . |
| 4,421,953 | 12/1983 | Zielinski . |
| 4,677,389 | 6/1987 | Op de Beek . |
| 4,754,486 | 6/1988 | Stafford . |
| 4,941,187 | 7/1990 | Slater .................................. 381/86 |

FOREIGN PATENT DOCUMENTS 60-58733  4/1985  Japan .

Primary Examiner—Forester W. Isen
Attorney, Agent, or Firm—J. Michael McClanahan

[57] ABSTRACT

An improved motorcycle intercom communications system between the motorcycle driver and passenger providing for stereo of listening from a radio, cassette player, or the like in each of both right and left helmet speakers wherein intercom communications may be had through microphones always activated located proximate the mouth of both driver and passenger, where when initiating speaking over the microphone, the stereo output of both right and left speakers of the driver's and passenger's helmets is terminated completely and the intercom conversation is heard in full. Upon the termination of the intercom conversation, the invention circuitry returns both sides of speakers to the pre-existing level of stereo output. The above is accomplished by dividing all sounds which come in over the microphone into a low frequency range and an audio speaking range wherein the output of a low frequency range filter is constantly sampled and compared with the energy output of the audio speaking range of frequencies. When the energy in the speaking range of frequencies exceeds the energy in the low frequency range, such is indicative that a party is speaking into the microphone and the circuit automatically terminates the output to both helmet speakers and injects the intercom on the helmet speakers.

15 Claims, 2 Drawing Sheets

MOTORCYCLE STEREO AUDIO SYSTEM WITH VOX INTERCOM

BACKGROUND OF THE INVENTION

1. Field of the Invention

The field of the invention is motorcycle stereo and intercom systems between the motorcycle rider and passenger.

2. Description of the Related Art

Currently available are audio stereo systems for motorcycle riders and passengers as motorcycle accessories which provide means by which the motorcycle rider and passenger may enjoy stereo music from a carried tape or disc cassette player, radio, or conversation on a Citizens Band (CB) transceiver. These systems comprise primarily two channel amplifier systems that input into the jack receptacle of the tape or disc cassette players and radio receivers, amplifying the sound in each channel and then directing it to sets of loudspeakers, such as earphones or headsets worn by the motorcycle driver and passenger. In many cases, earphones are fitted interiorly to the protective helmet worn by the rider and passenger and so oriented that the left channel of the stereo (when present) will appear in each of the left helmet earphones of the rider and passenger, and the right stereo channel (when present) appearing in the right helmet earphones of the motorcycle rider and passenger. For monaural sounds, the same sounds appear in both channels. In these cases, electrical cords connect to the earphone of each the rider and the passenger and plug into convenient connectors or jacks of the sound system to receive the audio entertainment.

The problems come when attempts are made to interconnect the stereo system with an intercom microphone system which permits communication between the rider and passenger while traveling on the motorcycle. In most cases, the microphone is similarly attached to each helmet worn by the motorcycle rider and passenger such that it, at all times is immediately forward of, but in close proximity to the party's mouth. For such systems, inherent problems reside in the fact that wind noise and other outside noises are picked up by the microphone in addition to the words spoken and sent into the interconnected stereo and intercom system. One solution has been to activate the microphones of the intercom system by means of separate manually operated on/off switches so that they may be turned on when one of the parties wishes to speak, and then turned off at the conclusion of the conversation.

Other solutions have been to have the microphone system on all the time, yet, adjust the sensitivity of the system so that noise and other sounds below a certain level are not amplified throughout the system, and, when speaking above that noise level, the speaking voice will be amplified and placed upon the earphones of both parties. However, systems of this type always need continuous adjustment depending upon the noise level. Unfortunately, the noise level also appears to rise as a direct function of the speed of the motorcycle, thus continually requiring adjustment of the sensitivity level to eliminate the noise. That, of course, introduces additional problems, such as: If the motorcycle has been traveling at a high rate of speed when last using the intercom system and the motorcycle then slows down, the manually adjusted sensitivity control is set so high that when utilizing the intercom system, the voice may not exceed the previously set sensitivity for a relatively loud noise level and thus may not be heard.

In addition, many existing VOX systems (voice activated systems) turn off immediately at the end of the last word spoken, so that if there is a pause between the words of the speaker, the system will have already shut down. Then, when the system comes back on for the next word spoken, that word will appear chopped or missing altogether as it takes the system time to reactivate.

Further, problems with the VOX systems currently available as motorcycle accessories are exacerbated with the new style of sport-type motorcycles presently coming upon the market in that they have smaller farings and less wind protection for the driver and passenger than the touring type motorcycles, and consequently more outside and extraneous noise is present.

Thus it is obvious that there is need for a stereo audio system with VOX intercom which overcomes the problems above discussed, i.e., that will automatically compensate for increased wind and other noise so that both the rider and passenger are not constantly having to adjust the sensitivity control to compensate for varying wind and other noises. A VOX system that stays on for a period of time even after the last person has spoken until it is reasonably clear that there will be no more conversation, and then, after muting or cutting off the stereo system, brings the system back to full volume.

Substantially most of the above objectives were achieved in our prior patent issued Jun. 28, 1988 and bearing U.S. Pat. No. 4,754,486. However, in the invention of our prior patent, we permitted the monitoring of the stereo audio system while in the VOX intercom mode by reducing the audio sounds in one side of the helmet loudspeakers. Since the time of our prior invention and subsequent selling of many units of the VOX intercom system, we have substantially improved that VOX intercom system wherein the new invention presented herein takes out all of the stereo system sounds during VOX operation, improves the sensitivity of the system rejecting wind and road noises, and makes other improvements which are herewith disclosed.

SUMMARY OF THE INVENTION

The embodiment of the invention described consists of a motorcycle stereo audio system with VOX intercom wherein the electronic circuit automatically compensates for increased wind and other noises by comparison of newly arrived noises which impinge on the microphone with sounds which existed to that point. The system is installed on a motorcycle, the bike then taken out and ridden at the speed which creates the maximum noise, generally the legal speed limit, and the sensitivity control potentiometer set at that point where the noise is not passed into the intercom system. This sensitivity setting will be different for different motorcycles, different type farings on motorcycles, different helmets, microphones, and speakers in helmets, however, once it has been set, it will not need to be touched again.

More specifically, the subject invention segregates sounds in the audio range coming into the microphone into two frequency ranges and discards others. Many frequencies which appear as noise in a system and which are due to wind or vibrations are relatively low frequency noise, in many cases less than 20 cycles per second. Additionally, many other noises, such as sirens, in addition to having energy in frequencies within the speaking range, also have substantial energy in frequencies above 6 kilocycles per second. Accordingly, the speaking audio range, nominally 500 hz to 4 khz, is segregated within the intercom system and is the frequency range through which the intercom system is operated. Audio sounds having a frequency below about 400 hz are segregated and then used as a means for comparison of their energy contained in this band to the energy in the audio speaking band. At all times, means are provided whereby no absolute level of noise or speaking into the microphone will interject itself into the VOX intercom system, but always a comparison is made between surrounding ambient noise in the low band to noise or words speaking in the allowed audio range. Therefore, only when the relative level of speaking is above the noise detected in the low band of frequencies do speaking voices interject themselves into the VOX intercom system and onto the earphones worn by the motorcycle rider and passenger.

Accordingly, once sensitivity has been set for the system on the motorcycle at the level of highest noise, no more setting is necessary and the VOX intercom system and the microphones remain on at all times and will operate to impart the spoken words into the earphones of the rider and passenger only when the microphone is spoken into regardless of the level of the outside noise. However, when the driver and passenger are not conversing and an extremely loud noise is perceived which does have energy in the audio speaking range, such as a nearby siren, the system permits the sound of the siren to actuate the VOX intercom system so that the rider and passenger, for safety's sake, are permitted to hear the sounds they might not have heard so that they may react to it as needed. After the over-riding sound has passed away, the system returns to its prior non VOX actuated state.

Accordingly, the system, as operating, channels the left and right output of a stereo or disc cassette player, radio receiver, or CB into each of the left and right helmet earphones of both rider and passenger respectively, only interrupted by the presence of speaking or possible emergency sounds in the audio frequency range. When that happens, the previously existing music or other sounds in the right and left stereo channels ar dropped out completely in both the right and left helmet earphones or speakers. The intercom system then works fully in the right and left helmet speakers of both the rider and passenger simultaneously. After the driver and passenger terminate their communication, within 3 to 4 seconds, the radio receiver or stereo player is brought back up to its full restored volume in both the left and the right ears.

The above is accomplished by means of two filters, a low-pass filter which cuts off at a high of approximately 400 hz, and a band-pass filter which captures audio signals in the range of about 500 hz to 4 khz. As indicated earlier, audio signals above about 4 khz are rejected. The output of the low-pass filter is amplified, half-wave rectified, and then summed by charging a capacitor, the voltage upon which is then directed to the negative input of a high-input impedance voltage comparator. The audio signals in the band-pass range of 500 hz to 4 khz are similarly amplified, half-wave rectified, and averaged by charging a second capacitor, the output of which is directed to the positive input of the same high-input impedance voltage comparator. The comparator is characterized as having a useful positive voltage output only when the voltage of the positive input exceeds the voltage of the negative input. Upon a positive output from the comparator, both stereo channels from the radio receiver, or tape or disc cassette player are terminated through use of electronic analog switches. Simultaneously, the audio speaking voice output of the band-pass filter is led directly into both left-and right-channel amplifying circuits for the helmet speakers so that the voice may be heard.

Upon the termination of signal output from the band-pass filter, signifying that speaking into the intercom has ceased, the comparator's positive voltage output drops to a sufficiently low level that the analog switches revert back to their prior state allowing the stereo sounds to return to the helmet speakers.

By use of selective capacitor draining resistors shunting the two charged capacitors, the output of the comparator during time of the the presence of audio signals in the band pass filtering system is prolonged an additional 3 to 4 seconds after the last word is spoken to ascertain that the speaker is through talking, or to give an opportunity to the other party to talk before the left and the right stereo channels are brought back to full volume in both left and right earphones.

Accordingly, it is an object of the present invention to provide a motorcycle stereo audio system with VOX intercom wherein the noise interference level at all speeds and under all conditions is always compensated for before the VOX system becomes operative.

It is another object of the subject invention to provide means for the VOX intercom system staying on an additional period of time to provide adequate time between spoken messages.

It is still a further object of the subject invention to provide a motorcycle stereo audio system with VOX intercom wherein the sensitivity control to account for noise may be set once depending on the motorcycle and other surrounding noise generators and then not need to be reset for varying noise levels of the motorcycle.

Other objects of the invention will, in part, be obvious and will, in part, appear hereinafter. The invention accordingly comprises the apparatus possessing the construction, combination of elements, and arrangement of parts which are exemplified in the following detailed disclosure and the scope of the application of which will be indicated in the claims.

BRIEF DESCRIPTION OF THE DRAWINGS

For further understanding of the features and objects of the subject invention, reference should be made to the following detailed description taken in connection with the accompanying drawings wherein.

In the various views, like index numbers refer to like elements.

DETAILED DESCRIPTION OF THE PREFERRED EMBODIMENT

Figure 1:
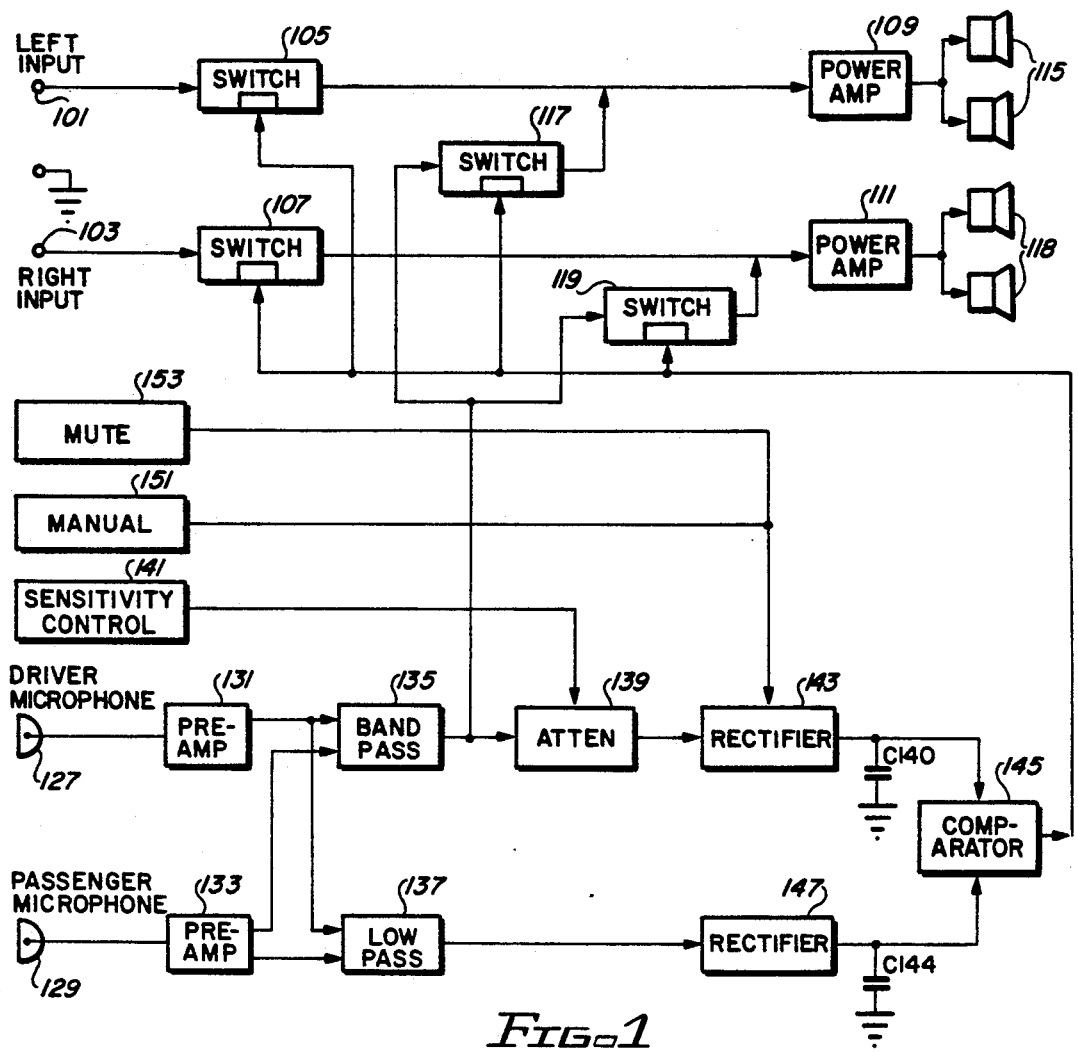
FIG. 1 is a functional block schematic diagram of the subject invention.

Referring now to FIG. 1, a detailed functional block schematic diagram of the newly improved motorcycle stereo audio system with VOX intercom. Generally, the subject invention functions similarly to our prior invention, however, changes have been made which have resulted in the system operating with additional clarity and ease over the prior system.

Prior to use of the microphone by the motorcycle driver or passenger, electrical audio signals from the existing radio, citizen's band radio, or stereo system such as a tape deck or compact disc, or the like is inputted on the left and right inputs 101 and 103 of the left and right switch and amplifier systems respectively. The inputs appear in the upper left-hand portion of FIG. 1. These input audio signals, in the form of electrical signals, are each inputted into electronic analog switches 105 and 107, switch 105 for the left input and switch 107 for the right input. These electronic switches are commercially available analog switches which give an electrical connection from one side to the other when they are pulsed with a positive electrical input switch signal, shown here entering the switching terminal from the bottom. When the switch signal is absent, the electrical connection is interrupted. The left and right audio inputs, after passing electronic switches 105 and 107 respectively, are directed to left and right power amplifiers 109 and 111, respectively. These power amplifiers amplify the electrical audio signal prior to driving the helmet speakers. Speakers 115 represents the left helmet speakers of the motorcycle driver and passenger, and speakers 118 represents the right helmet speakers of the motorcycle driver and passenger.

It is noted that intersecting the electrical lines connecting the respective left and right electronic switches to their power amplifier is the output of another pair of switches, namely electronic analog switches 117 and 119. These switches permit the introduction of the electrical output audio signals of the driver and passenger microphones into the left and right channels and into the helmet speakers to enable both parties to talk to each other as they ride the motorcycle. The injection of the outputs of the microphones into the helmet speaker circuits is discussed later.

At the bottom of FIG. 1 is the block schematic diagram circuitry of the intercom system to receive electrical audio signals from the driver and passenger microphones, to process the signals, and to insert them into the power amplifier inputs at the top portion of the figure in order to provide for the intercom system, as well provide means for inhibiting the inputs from the other audio sources such as the radio, citizen's band radio, stereo tape deck, etc. First, the driver's microphone 127 and the passenger's microphone 129 are connected to their respective preamplifiers 131 and 133 for initial amplification of about 40 db. Those amplified signals are utilized for the further processing of the audio signals. Next, the outputs of the respective preamplifiers are directed to band-pass filter 135 and low-pass filter 137.

Band-pass filter 135, in its design, is connected as a series-parallel circuit and generally passes the speaking voice audio frequencies between the range of about 500 hz and 4 khz. The output of band-pass filter 135 is connected to sensitivity control signal attenuator 139, with the attenuation of the signal controlled by a DC voltage from sensitivity control 141, which may also be used as a squelch control. The output of signal attenuator 139 is connected to rectifier 143 which consists primarily of a forward biased diode which passes positive and some negative portions of the audio signals from attenuator 139 to charge capacitor C140. The purpose of the electrical network from the driver's and passenger's microphones to the output of rectifier 143 (which output is stored on energy storage device, namely capacitor C140) is to controllably pass through means of the mute and manual controls, later discussed, electrical audio signals in the range of about 500 hz or 4 khz to the first input of a voltage comparator, namely comparator 145.

The second input to the comparator, to which the first input is compared, is received from low-pass filter 137 as follows: Like the outputs of the driver's and passenger's microphone preamplifiers connected to the band-pass filter 135, the outputs of these preamplifiers are also connected to low-pass filter 137. Low-pass filter 137 passes extraneous audio frequency noise, i.e., electrical audio signals in the range of about 400 hz and below, rejecting electrical signals having a frequency higher than that. Low-pass filter 137 comprises a commercially available intergrated circuit connected to operate as both a low-pass filter and an amplifier. The output of low-pass filter 137 is connected to rectifier 147 which is forward biased to pass the positive and slightly negative portions of the output of low-pass filter 137, and stores the current output on energy storage device, namely capacitor C144. Capacitor C144 then is connected to the second input to comparator 145.

Both positive inputs to comparator 145 are compared such that comparator 145 has a positive output when the first input is greater than the second, i.e., the driver or passenger is speaking (since most spoken sounds are in the range of 500 hz to 4 khz). However, when neither the passenger nor the driver are speaking, comparator 145 output is only slightly positive, near 0 vdc. If there is an extremely loud noise which has audio components above 500 hz, such as a passing emergency vehicle, then for safety's sake, the audio signals are picked up by the driver and passenger microphones, are amplified and passed through band-pass filter 135, attenuator 139, rectifier 143, capacitor C140 and into comparator 145, so that there will be a positive output from the comparator. The output of the comparator does not go directly onto the helmet speakers but is used to decide what will go onto the helmet speakers, whether it is the intercom conversation between the driver and the passenger (or a loud noise having frequency components in the speaking audio range), or audio signals from whichever stereo, radio, citizen's band or the like that is connected to left and right input 101 and 103, respectively. In this respect, the output of comparator 145 is the control signal.

The intercom conversation between the driver and the passenger is injected into the helmet speaker circuits by means of left and right analog switches 117 and 119 respectively, shown in the left and right channel circuits. Firstly, the output of the band-pass filter 135 is directed to analog switches 117 and 119, with the output of switch 117 connected directly to the line leading to left power amplifier 109, and the output of switch 119 connected directly into right power amplifier 111. It is noted that the output of comparator 145 is directed to the four electronic analog switches 105, 107, 117, and 119 such that with respect to switches 105 and 107, the input electrical signals from the radio or citizen's band in each the left and right channel is interrupted in their path to their respective power amplifiers 109 and 111 by signals from comparator 145. At the same time, comparator 145 output turns on switches 117 and 119 allowing the insertion of the electrical output of band-pass filter 135 into each of the left and right channels and thus to direct these sounds to the headset speakers of the helmets.

Since the circuit leading up to comparator 145 is designed to switch the stereo, radio, or citizen's band back into the power amplifiers and helmet speakers a short time after the driver and the passenger have ceased conversation, there are times when the driver and passenger would like to keep the system totally in the intercom mode. That is accomplished through the mute/manual rectifier 143, and more particularly, manual control switch 151. This switch, when on, biases the diode of rectifier 143 very positive such as to load capacitor C140 to render the first input to comparator 145 very positive and thus turn off switches 105 and 107 and turn on switches 117 and 119. In that position, the intercom circuit will always be on.

Similarly, in the event that the motorcycle driver is riding without a passenger, or does not wish conversation with the passenger, he may switch the mute control switch 153 to on, at which point it will bias the diode of rectifier 143 near zero volts and hold capacitor C140 at a very low voltage, also near zero volts, so that switches 105 and 107 in line with the left and right stereo channels are always on, and switches 117 and 119 in line with speaking voice information from band-pass filter 135 are always off.

Figure 2:
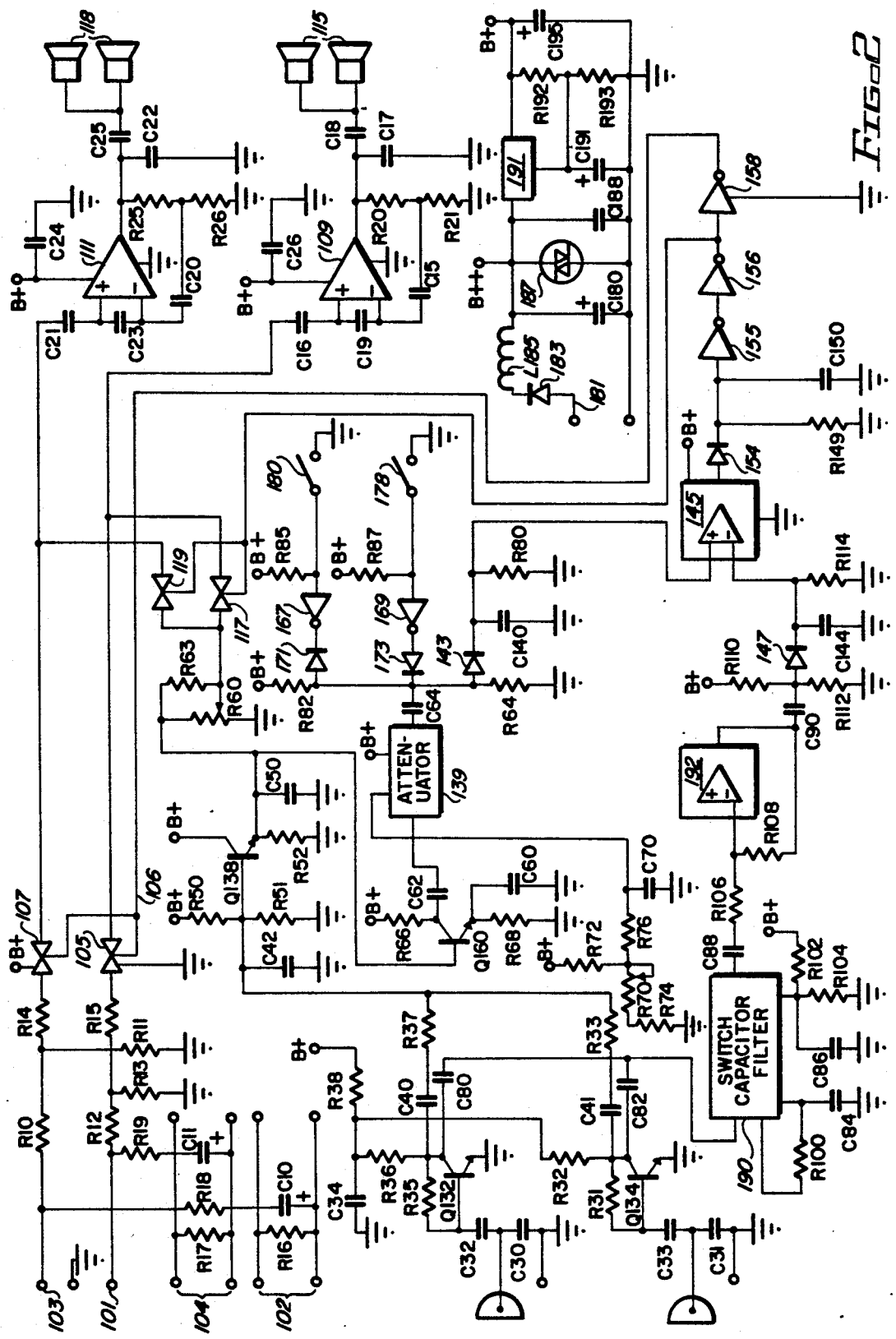
FIG. 2 is a complete schematic of the subject invention.

FIG. 2 is a complete schematic of the subject invention showing the discrete components making up the functional blocks. Initially shown in generally the upper left-hand corner are the stereo left input 101 and right input 103. Each of these inputs are resistance divided by series resistor R10 and grounding resistor R11 on right input 103 and series resistor R12 and grounding resistor R13 on left input 101. The reduced electrical signal then is conducted to resistors R14 and R15 respectively where they now enter electronic analog switches 107 (right input) and 105 (left input).

It is noted that the stereo inputs 103 and 101 may be connected to a stereo player, to a walkman, or to any source of audio signals. In addition, they may be connected to the output of an existing AM/FM radio or Citizen's Band (CB) radio situated on the motorcycle and, for connection to such an existing radio, details are shown. Immediately above the left and right stereo inputs are shown the electrical wires running between the existing radio and its left and right speakers. In connecting to the existing radio, resistors R16 and R17 are individually attached between the two lines running to each speaker. On the positive or high line, capacitor C10 in series with resistor R18, joins the radio right speaker wire to the right stereo input 103 and capacitor C11 in series with resistor R19 connects the radio positive or high-line wires of the left speaker to the left stereo input 101.

Continuing, the left audio input exits left electronic analog switch 105 to input into left power amplifier 109 through dc isolation capacitor C16. Power amplifier 109 is an intergrated circuit amplifier commercially available and is connected with discrete components in accordance with suggestions of the manufacturer. It utilizes feedback resistor R20 in a resistance divider network with resistor R21 and capacitor C15 whereby a portion of the output is returned into the negative input to reduce the possibility of high frequency oscillations. Power supply B+ connecting amplifier 109 is decoupled to ground with capacitor C26. Capacitors C19, C17, and C26 eliminate high frequency oscillations that have a tendency to occur with this type of power amplifiers and capacitor C18 dc isolates the helmet loudspeakers from the output of the power amplifier. The output of left channel amplifier 109 is passed to both left speakers 115 in the driver's and passenger's helmets.

The right channel from stereo input 103 is identical to the left, and after passing electronic analog switch 107 is conveyed to the input of right power amplifier 111 which, in being connected identically to left power amplifier 109, has dc isolation capacitor C21 on the amplifier positive input and capacitor C25 on the output. A negative feedback circuit comprises resistors R25 and R26 in a voltage divider network with capacitor C20 connecting back to the negative input of the amplifier. Like the case with amplifier 109, capacitors C22, C23, and C24 coupled to amplifier 111 eliminate high frequency oscillations that have a tendency to occur. Lastly, the audio signals exiting right amplifier 111 are conveyed to the right speakers 119 of the passenger's and driver's helmets.

It is noted that both of the lines between the left and right channel electronic analog switches 105 and 107 and their respective connected power amplifiers 109 and 111 are intersected by lines exiting electronic analog switches 117 and 119, respectively. As previously discussed, these switches permit the insertion of intercom conversation between the driver and passenger into the left and right channel circuits that direct the audio signals to the helmet speakers of the parties. Shown in FIG. 2 is the switch on, switch off control line 116 going to the switching terminal of both analog switches 117 and 119. As a matter of fact, both these analog switches are packaged in the same intergrated circuit package. While the analog switches 117 and 119 permit the insertion of the driver and passenger speaking electrical audio signals into the inputs of the respective amplifiers, the stereo input signals passing through previously described analog switches 105 and 107 must be cut off and that is done by means of switch on, switch off control line 106. The particular signals that flow through lines 116 and 106 to open and close their respective analog switches at appropriate times are discussed later in connection with comparator 145.

Referring now to generally the middle of the left-hand portion of FIG. 2, the driver's microphone 127 and passenger's microphone 129 are shown. First, the shield which surrounds the wire running to each microphone is grounded with capacitors C30 (driver) and C31 (passenger). Then, the output of each of the driver's and passenger's microphone is directed to preamplifiers 131 and 133, respectively (FIG. 1), comprising primarily transistors Q132 and Q134. The transistors are each wired in conventional amplifier fashion to yield a gain of approximately 40 db. The inputs to transistors Q132 and Q134 are dc isolated by means of input capacitors C32 and C33, respectively. The collectors of both transistors are directed through resistors to B+, nominally 9 volts dc, resistor R36 connecting to transistor Q132 and resistor R32 connecting to transistor Q134. Both these resistors attach to resistor R38 which connects to B+. Capacitor C34 is a high-frequency decoupling capacitor grounding the junction of resistors R36 and R38 which assures that low-frequency signals are not conveyed from B+ onto the preamplifiers or are placed onto B+ by the preamplifiers.

The outputs of each of the two preamplifiers 131 and 133 are first combined and then go in two directions, the first to the band-pass filter 135 (FIG. 1) made up of capacitors C40 and C41, resistors R37 and R33, and capacitor C42. This series-parallel circuit making up the band-pass filter combines the output of both driver and passenger preamplifiers and inputs it into transistor Q138 connected as an emitter follower. Emitter followers are characterized as having high input impedance and low output impedance. The base of transistor Q138 is biased to B+ through resistors R50 and R51 connected in a voltage divider to turn the transistor on. The output of emitter follower Q138, which contains the audio signals from the driver and passenger microphones, is directed to two places, namely to the analog switches 117 and 119 for insertion of the intercom conversation into the left and right power amplifiers 109 and 111 and then out to the driver and passenger helmet speakers, and to comparator 145 for comparison against the output of the low-pass filter 137 (FIG. 1), both comparator and low pass filter discussed following.

First, the output of emitter follower 138 passes dc isolation capacitor C52 to the volume control, namely adjustable potentiometer R60, the performance (or curve of the) potentiometer is shaped by resistor R63. The output of potentiometer R60 is taken off its sweep arm and directed into both electronic analog switches 117 and 119 where, when the switches are turned on, allows the injection of the speaking audio electrical signals into both left and right power amplifiers 109 and 111, respectively. As mentioned before, when switches 117 and 119 are turned on, switches 105 and 107 are turned off. The control of both of these switches is discussed later.

The other place that the output of band-pass filter 135 is directed following the emitter follower, is to the sensitivity control attenuator 139, but first the output enters the base of transistor Q160 connected as an amplifier whose gain is about 10 db. The collector of transistor Q160 is tied by resistor R66 to B+ and the emitter is grounded through resistor R68. Paralleling resistor R68 is capacitor C60 which sets the gain for high frequencies. DC isolation capacitor C62 connects the output of the amplifier with the input of dc controlled attenuator 139. Controlling the attenuation of attenuator 139 is the sensitivity control potentiometer R70 shown to the left of attenuator 139 and near the bottom left of the figure. Potentiometer R70 connects between B+ and ground having resistors on either side, namely resistor R72 between the potentiometer and B+, and resistor R74 between the potentiometer and ground. The adjustable arm of potentiometer R70, which is the output, is connected with in-line resistor R76 and then high frequency shunted to ground through capacitor C70. By adjusting the output arm of potentiometer R70, a varying dc voltage is placed on attenuator 139, which has the effect of varying its output. The output of attenuator 139 connects to dc isolation capacitor C64 and then onto rectifier 143, namely diode 143. Energy storage capacitor C140 paralleled by drain resistor R80 connects the output of diode 143 to ground. Biasing diode 143 in a slightly forward conducting configuration is a resistor divider network with resistor R82 connecting the diode anode to B+ and resistor R84 between the diode anode and ground.

It is noted that at the junction of the voltage divider network and diode rectifier 143 are inputs from the manual control switch 178 and the mute control switch 180. The circuits associated with these control switches are shown as blocks in FIG. 1 (mute control 153 and manual control 151). One side of each switch is grounded and the other side is connected to inverters and biased to B+ through resistors R85 (mute switch 180) and R87 (manual control switch 178). The manual control switch grounds the input to inverter 169 when switched to "on." Mute control switch opens the input to inverter 167 when switched to on. Each voltage level provided by biasing to B+ (when the switch is not grounded) is directed to inverter 167 (mute switch control 180) and inverter 169 (manual control 178). Following each of the inverters are diodes in the line, noticed to be in position reversed to each other, diode 171 connecting the output of inverter 167 in mute switch control 180 circuit and diode 173 connecting the output of inverter 169 in line of manual control 178 circuit. Both mute control 180 and manual control 178 are single-pole, single-throw switches.

In operation, when manual switch control 178 is on, i.e., grounded, zero volts is placed on the input to inverter 169 which means that a positive voltage exists at its output. This positive voltage is coupled through diode 173 to the anode of diode 143 which is equivalent to a highly positive output (of attenuator 139) voltage passing diode 143 to the plus input of comparator 145. When the manual switch 178 is on, the intercom system is permanently turned on so that at no time will the stereo inputs, or inputs from the motorcycle radio, enter the audio power amplifiers so that the system is locked in the intercom mode. When the manual control switch 178 is off, a positive voltage is presented to the input of inverter 169 resulting in a zero voltage output so the manual control has no effect upon the input to diode 143 or to comparator 145. In such case as this, of course, the stereo input will go back on line to the helmet speakers a short time following the conversations between the driver and passenger.

Mute control switch 180, when in the open position, allows a positive voltage to appear on the input to inverter 167 resulting in a zero voltage output. With a zero voltage placed on the cathode of diode 171, current will be conducted from B+ through resister R82 across diode 171 resulting in essentially a very low voltage (the voltage drop of diode 171), appearing at the anode of diode 143. Effectively then, zero volts is placed on the first input to comparator 145. This inhibits an output from comparator 145 so that no speaking audio signals are injected into the power amplifiers. Mute switch is used when the driver is on the motorcycle by himself and he does not wish his own speaking into the microphone to come back to him in the helmet speakers or when he does not wish to talk with the passenger. When mute switch 180 is grounded, i.e., placed to "off," the output of inverter 167 is a highly positive voltage, and no effect is had upon the diode 143.

At this point, it has been established that there are three possible inputs to the positive input of comparator 145, i.e., the first being audio signals from the driver and passenger microphones through the band-pass filter, the amplifiers, and the sensitivity control attenuator 139. This places the electrical conversation signals through rectification and smoothing (diode 143 and capacitor C140) and onto the positive input of comparator 145. The other two possible inputs to the positive input of comparator 145 are the inputs given by the manual control switch 178 and mute control switch 180 discussed immediately above.

The negative input to comparator 145 also comes from the driver and passenger microphones and from their preamplifiers but is that part of the audio signals rejected by the band-pass filter and accepted by the low-pass filter. In this case, the outputs of the preamplifier transistors Q132 and Q134 are passed through dc isolation capacitors C80 and C82 to join to the input to the low-pass filter 137 (FIG. 1) which consists in part of switch capacitor filter 190 which is a portion of an intergrated circuit. This intergrated circuit is connected in accordance with instructions from the manufacturer to accomplish a low-pass filter such that signals generally having a frequency 400 hz and below are passed. Exterior connected resistors R100, R102, and R104 are values determined in accordance with the manufacturer's instructions as are the values of exterior connected capacitors C84 and C86. The output of switch capacitor filter 190 is next directed to dc isolation capacitor C88 and in-line resistor R106 and on to the negative input of amplifier section 192 of the intergrated circuit. Amplifier 192 is configured as a feedback amplifier with a portion of the output returned to the input through resistor R108. Thereafter, the output of amplifier 192 is directed through dc isolation capacitor C90 into rectifier 147 (FIG. 1) consisting of diode 147 and connected elements. Diode 147 is slightly biased on by means of a resistor divider network of resistors R110 and R112. By the relative size of these resistors, the anode of diode 143 is biased just a few volts above ground so that negative swings of the low frequency audio signals emanating from amplifier 192 are partially clipped. Portions of the signal which do not cause diode 147 to turn off are passed and the diode acts as a rectifier. The signals are smoothed by energy storage capacitor C144 to ground which also loads. The capacitor is continually drained through shunt resistor R114. The output, after smoothing by capacitor C144, is inputted into the negative input of comparator 145.

Comparator 145 is an intergrated circuit having a positive and negative input whose output will be close to B+ voltage when there is a positive input in excess of the negative input, i.e., an output of the band-pass filter, i.e., the driver and the passenger are talking. The comparator output will swing near to zero volts when the driver and passenger are not talking. Road and motorcycle noise in the band-pass filter is cancelled in the comparator by noise in the low-pass filter so that the comparator does not output a signal and the noise is not conveyed to the helmet speakers.

Thereafter, the output of the comparator 145 is halfwave isolated through diode 153 where energy is stored upon capacitor C150 to ground. A large resistor, R149, slowly drains capacitor C150. Capacitor C150 tends to smooth the output of diode 153 and places a time delay into the line such that the voltage at the capacitor does not decline immediately upon the cessation of talking but will remain for a period of a few seconds, perhaps 3 or 4. This way, opportunity is allowed for the driver or passenger to pause in their conversation to allow the other to speak. If however, the conversation is not picked up after the 3 or 4 seconds, the voltage across capacitor C150 will have declined sufficiently that the switches will be allowed to return the stereo input to the helmet speakers.

To accomplish all of the switching back and forth between the intercom and the stereo input into the speakers, the signal residing on the capacitor C150 is directed first through a pair of inverters 155 and 156 to increase the rise and fall time of the switching signal to the analog switches. There is a threshhold voltage which inverter 155 recognizes as a digital "1" input such that its output is a digital "0", or zero vdc. That level of voltage is the voltage referred to above as being held for 3 or 4 seconds before the switches return the stereo input to the helmet speakers. After the signal exits the second inverter 156, it is sent to the control terminals of analog switches 119 and 117, those switches turning on to input the intercom conversation from the driver and passenger microphones to the helmet speakers. The signal output from inverter 156 then is passed to a third inverter 158, and the inverse voltage of inverter 156 then sent to analog switches 105 and 107, thus cutting off the line from the stereo or radio input into the helmet speakers. It is noted that the pair of analog switches controlling the line between the stereo input and the helmet speakers, and the analog switches controlling the line between the driver and passenger microphones and the helmet speakers are in opposite phase to each other. That is, when the intercom analog switches 117 and 119 are turned on, stereo input switches 105 and 107 are turned off. And of course, the reverse also is true.

Lastly, the means by which power is supplied to the electronic circuit discussed above is shown in the lower left hand corner wherein the input wire 181 from the motorcycle battery positive terminal is shown passing first through protective diode 183 which prevents the electronic circuit of the regulator from suffering damage if the input wires to the battery are mistakenly reverse connected. Thereafter, inductor L185 and capacitor C180 smooth the input from the battery so that sharp electrical spikes from the motorcycle generator and/or the ignition system are impeded by the inductor and shunted to ground by the capacitor. Thereafter, transient voltage suppressor diode 187 is connected between the input line and ground and at that point voltage B++ is generated, normally close to the battery voltage. Capacitor C188 connects between the B++ and ground. Following capacitor C188 is voltage regulator circuit 191, an intergrated circuit, placed into the line and connected with resistors R192 and R193 and capacitor C191 in accordance with instructions of the manufacturer of the voltage regulator. Lastly, smoothing capacitor C195 spans between the output regulated power line B+ and ground. In most applications, with a 12-volt motorcycle battery, B+ will be a regulated 9 volts positive.

The following is a parts list of the different elements comprising the invention.

| RESISTORS | | | |
|---|---|---|---|
| R10 | 3.3k | R52 | 1k |
| R11 | 330 | R60 | 5k |
| R12 | 3.3k | R62 | 1k |
| R13 | 330 | R66 | 2.2k |
| R14 | 1k | R68 | 1k |
| R15 | 1k | R70 | 10k |
| R16 | 68 | R72 | 33k |
| R13 | 330 | R74 | 470 |
| R14 | 1k | R76 | 4.7k |
| R15 | 1k | R80 | 100k |
| R16 | 68 | R82 | 470k |
| R17 | 68 | R84 | 100k |
| R18 | 5.6k | R85 | 4.7k |
| R19 | 5.6k | R87 | 4.7k |
| R20 | 220 | R100 | 47k |
| R21 | 5.1 | R102 | 10k |
| R25 | 220 | R104 | 10k |
| R26 | 5.1 | R106 | 10k |
| R32 | 10k | R108 | 100k |
| R33 | 10k | R110 | 470k |

-continued

| | | | |
|---|---|---|---|
| R36 | 10k | R112 | 100k |
| R37 | 10k | R114 | 100k |
| R38 | 330 | R149 | 470k |
| R50 | 100k | R192 | 270 |
| R51 | 47k | R193 | 1.5k |
| C10 | 10 uf | C41 | 0.002 uf |
| C11 | 10 uf | C42 | 0.022 uf |
| C15 | 100 uf | C52 | 0.1 uf |
| C16 | 0.1 uf | C60 | 1 uf |
| C17 | 0.4 uf | C62 | 0.1 uf |
| C18 | 220 uf | C64 | 1 uf |
| C19 | 0.01 uf | C70 | 10 uf |
| C20 | 100 uf | C80 | 0.1 uf |
| C21 | 0.1 uf | C82 | 0.1 uf |
| C22 | 0.4 uf | C84 | 470 puf |
| C23 | 220 uf | C86 | 0.1 uf |
| C24 | 0.2 uf | C88 | 10 uf |
| C25 | 22 uf | C90 | 1 uf |
| C26 | 0.2 uf | C140 | 1 uf |
| C30 | 0.2 uf | C144 | 1 uf |
| C31 | 0.2 uf | C150 | 4.7 uf |
| C32 | 0.1 uf | C180 | 220 uf |
| C33 | 0.1 uf | C188 | 0.1 uf |
| C34 | 10 uf | C191 | 10 uf |
| C40 | 0.002 uf | C195 | 220 uf |

SEMICONDUCTORS

| | | | |
|---|---|---|---|
| Transistor Q132 | 2N4401 | Diode 143 | 1N914 |
| Transistor Q134 | 2N4401 | Diode 147 | 1N914 |
| Transistor Q138 | 2N4401 | Diode 151 | 1N914 |
| Transistor Q160 | 2N4401 | Diode 171 | 1N914 |
| | | Diode 173 | 1N914 |
| | | Diode 183 | 1N5819 |

MISCELLANEOUS

| | | | |
|---|---|---|---|
| Amplifier 109 | LM383 | Inductor L185 | 1000 pH |
| Amplifier 111 | LM383 | Voltage | |
| Switch Capacitor | | Regulator 191 | LM317 |
| Filter 190, 192 | MF6-1000 | Transient Voltage | |
| Comparator 145 | MF6-1000 | Suppressor | 1N627 |
| Attenuator 139 | NC 2340 | | |
| Analog Switches | | Invertors 150, 156, | |
| 105, 107, | | 158, 167, 169 | |
| 117, 119 | CD4066 | | MM74C04 |

Figure 3:
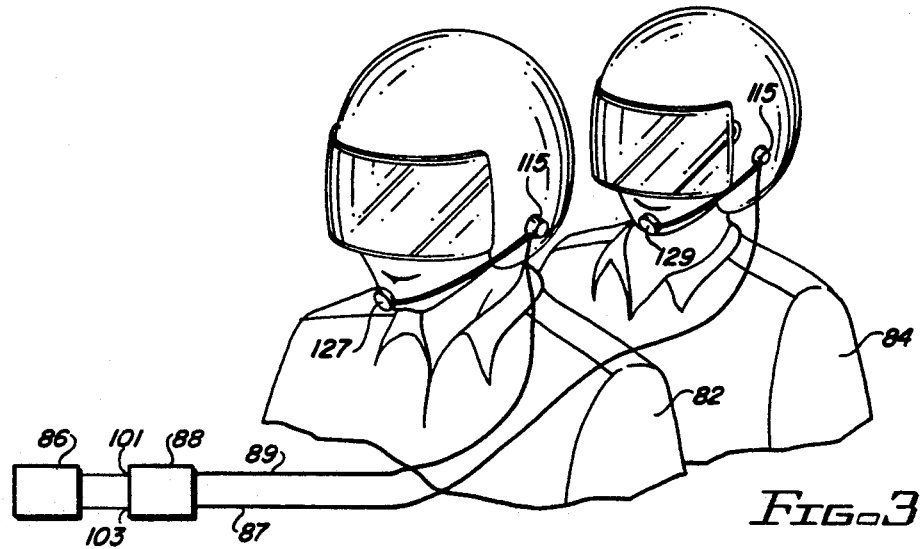
FIG. 3 is a combined perspective view and block schematic drawing of the subject invention with motorcycle rider and passenger.

Continuing, FIG. 3 shows a combined perspective view and block schematic diagram of the invention as it is used by the motorcycle passenger and driver. For ease of drawing, the motorcycle is not shown, however, the relative positions of the motorcycle driver 82 to the passenger 84 is shown as they would be sitting on their respective seats on the motorcycle with the passenger behind the driver. Block 88 shows the container in which the electronic circuits of the invention are housed, additionally showing inputs 101 and 103, the left and right stereo channel from the associated stereo radio receiver, CB, or audio cassette player 86, each channel connecting with the appropriate terminals described in FIG. 2. Shown exiting from block 88 are the wire sets 87 and 89 running to the driver and passenger left speakers 115 and on to microphones 127 and 129 of the driver and passenger respectively. The microphone is attached to the helmet worn by each of the parties and is situated proximate each respective party's mouth. The speakers are mounted inside the helmets, however, for illustrative purposes, are shown as solid line elements in FIG. 3. The right speakers (not shown) are on the opposite inside portion of each helmet and are connected by wiring contained in wire sets 87 and 89, crossing over from the left earphones interior to the helmet.

While it is realized that the subject invention has been presented as an accessory for a motorcycle rider and passenger, it is apparent that the system may also be used in other types of noisy environments, such as, for example, a machine shop. In this case, the speaker inputs could be attached to headsets worn by the employees or a loudspeaker on the wall. Having strategically placed open microphones around the machine shop or attached to each headset would permit persons to utilize the invention and would broadcast what was said over the din of the environment.

While a preferred embodiment of the device has been shown and described, it will be understood that there is no intent to limit the invention by such disclosure, but rather it is intended to cover all modifications and alternate constructions falling within the spirit and the scope of the invention as defined in the appended claims.

We claim:

1. An improved motorcycle stereo audio system with VOX intercom for a rider and passenger comprising:
   an intercom system adapted to receive a speaking voice and extraneous audio frequency noise, said intercom system outputting said speaking voice and a control signal when the speaking voice exceeds the extraneous audio frequency noise, said intercom system including:
      a plurality of microphones to receive and convert said speaking voice and extraneous audio frequency noise to electrical signals,
      a plurality of preamplifiers, one each of said plurality of preamplifiers operably attached to one each of said plurality of microphones,
      a band pass filter and a low pass filter, said band pass filter and said low pass filter operably attached to each of said preamplifiers, said band pass filter adapted to segregate said electrical signals in said speaking voice and said low pass filter adapted to segregate said electrical signals of said extraneous audio frequency noise having a frequency below the speaking voice,
      a comparator operably attached to said band pass filter and to said low pass filter, said comparator outputting said control signal, and;
      a mute control and a manual control operably connected interposed said band pass filter and said comparator, said mute control inhibiting said comparator outputting said control signal, and said manual control compelling said comparator to output said control signal;
   a left switch and amplifier system adapted to receive as an input the left stereo channel of an associated stereo audio signal and to output said left stereo channel to a left speaker, said left switch and amplifier system operably connected to said intercom system to receive said intercom system control signal and speaking voice; and
   a right switch and amplifier system adapted to receive as an input the right stereo channel of an associated stereo audio signal and to output said right stereo channel to a right speaker, said right switch and amplifier system also operably connected to said intercom system to receive said intercom system control signal and speaking voice whereby when the speaking voice exceeds the extraneous audio frequency noise, said intercom system comparator outputs said control signal, said control signal selectively switching on and off said left and right stereo channel from said left and right stereo channel output to said left and right speaker respectively and injecting said speaking voice into said left and right switch and amplifier systems to output said speaking voice in said left and right speaker.

2. The improved motorcycle stereo audio system with VOX intercom as defined in claim 1 wherein said band pass filter has a plurality of inputs and an output, one of each of said inputs connected to one each of said plurality of preamplifiers, said output comprising said speaking voice electrical signals, said band pass filter output operably connected to both said left and right switch and amplifier system to inject said speaking voice electrical signals into both said left and right switch and amplifier system, said left and right switch and amplifier system outputting said speaking voice on both said left and right speaker when said intercom system control signal is received by both said left and right switch and amplifier system.

3. The improved motorcycle stereo audio system with VOX intercom as defined in claim 2 wherein each said left and right switch and amplifier systems include a first electronic switch, said first electronic switch having an interruptable input and output, and a switching terminal, said electronic switch input operably receiving said stereo channel from the associated stereo audio signal, said output operably connected to said speaker, said switching terminal operably attached to said intercom system to receive said control signal whereby said first electronic switch interrupts said stereo channel when said control signal is received from said intercom system.

4. The improved motorcycle stereo audio system with VOX intercom as defined in claim 3 wherein each said left and right switch and amplifier system includes a second electronic switch having an interruptible input and output, and a switching terminal, said electronic switch input and output operably connected interposed said intercom system speaking voice output and said speaker respectively, said switching terminal operably connected to said intercom system control signal output whereby when said control signal is received by each said second electronic switch, said speaking voice from said intercom system is operably connected to said left and right speaker.

5. The improved motorcycle stereo audio system with VOX intercom as defined in claim 4 wherein said intercom system comparator has a first and second input, said first input operably connected to said output of said band pass filter, and said second input operably connected to said low pass filter, said comparator having an output, said comparator output operably attached to said switching terminal of each said first and said second electronic switch of each said left and right switch and amplifier system, said comparator output comprising said intercom system control signal output.

6. The improved motorcycle stereo audio system with VOX intercom as defined in claim 5 wherein said intercom system includes a sensitivity attenuator, said sensitivity attenuator interposed said band pass output and said comparator first input, said sensitivity attenuator operably reducing said speaking voice electrical signals output of said band pass filter.

7. The improved motorcycle stereo audio system with VOX intercom as defined in claim 6 wherein said intercom system sensitivity attenuator includes a sensitivity control, said sensitivity control variably adjusting the reduction of said speaking voice electrical signals output of said band pass filter.

8. The improved motorcycle stereo audio system with VOX intercom as defined in claim 7 wherein said mute control and said manual control of said intercom system are jointly operably connected to a mute/manual rectifier interposed said sensitivity attenuator and said comparator first input, said mute control and said manual control providing a voltage bias to said mute/manual rectifier, said mute/manual rectifier halfwave rectifying said speaking voice electrical signals output of said sensitivity attenuator.

9. The improved motorcycle stereo audio system with VOX intercom as defined in claim 8 wherein said mute control includes means to inhibit said intercom system control signal output whereby said speaking voice electrical signals are never injected into said left and right switch and amplifier system.

10. The improved motorcycle stereo audio system with VOX intercom as defined in claim 9 wherein said intercom system manual control includes means to continually output said control signals from said comparator whereby said speaking voice electrical signals are continually injected into said left and right switch and amplifier systems to output said speaking voice on said left and right speaker.

11. The improved motorcycle stereo audio system with VOX intercom as defined in claim 10 wherein said intercom system includes a first energy storage element interposed said mute/manual rectifier and said comparator first input, said first energy storage element receiving said halfwave rectified speaking voice electrical signals to create a DC voltage level to input to said comparator first input.

12. The improved motorcycle stereo audio system with VOX intercom as defined in claim 11 wherein said intercom system includes a second rectifier interposed said low pass filter and comparator second input, said second rectifier halfwave rectifying said extraneous audio frequency noise electrical signals outputted from said low pass filter.

13. The improved motorcycle stereo audio system with VOX intercom as defined in claim 12 wherein said intercom system further includes a second energy storage device interposed said second rectifier and said comparator second input, said second energy storage device receiving said halfwave rectified extraneous audio frequency noise electrical signals from said second rectifier to create a DC voltage level for input to said comparator second input whereby said comparator compares said DC voltage level of said first input to said DC voltage level of said second input, said comparator outputting said control signal when said first input voltage level exceeds said second input voltage level indicating said speaking voice exceeds said extraneous audio frequency voice.

14. The improved motorcycle stereo audio system with VOX intercom as defined in claim 13 wherein each said left and right switch and amplifier system includes a power amplifier interposed said first electronic switch and said speaker, said power amplifier receiving said stereo channel and said speaking voice electrical signals for amplification and direction to said speaker.

15. The improved motorcycle stereo audio system with VOX intercom as defined in claim 14 wherein each said left and right switch and amplifier system speaker includes a plurality of earphones, one each said left earphone and one each said right earphone for the rider and passenger.

* * * * *